(12) United States Patent
Holbrook et al.

(10) Patent No.: US 9,677,716 B2
(45) Date of Patent: Jun. 13, 2017

(54) STAGNANT FUEL THERMAL INSULATION SYSTEM

(71) Applicant: The Boeing Company, Chicago, IL (US)

(72) Inventors: Michael Lyle Holbrook, Port Townsend, WA (US); Kevin O'Brien Gaw, Tukwila, WA (US); Gregory M. Waugh, Renton, WA (US); Ronald Lawrence Clements, Kent, WA (US)

(73) Assignee: THE BOEING COMPANY, Chicago, IL (US)

( * ) Notice: Subject to any disclaimer, the term of this patent is extended or adjusted under 35 U.S.C. 154(b) by 252 days.

(21) Appl. No.: 14/194,914

(22) Filed: Mar. 3, 2014

(65) Prior Publication Data

US 2014/0174557 A1 Jun. 26, 2014

Related U.S. Application Data

(62) Division of application No. 13/217,523, filed on Aug. 25, 2011, now abandoned.

(51) Int. Cl.
*F16L 9/14* (2006.01)
*F17D 1/08* (2006.01)
(Continued)

(52) U.S. Cl.
CPC .............. *F17D 1/08* (2013.01); *B64D 37/34* (2013.01); *F16L 59/022* (2013.01); *F16L 59/14* (2013.01);
(Continued)

(58) Field of Classification Search
USPC ............................ 138/106, 129, 148, 149, 38
See application file for complete search history.

(56) References Cited

U.S. PATENT DOCUMENTS 1,383,680 A * 7/1921 Waldorf .................. F16L 59/06
138/148
1,851,559 A * 3/1932 Arey ....................... F28G 3/166
138/114
(Continued)

FOREIGN PATENT DOCUMENTS

CN 101970298 A 2/2011
CN 201808671 U 4/2011
(Continued)

OTHER PUBLICATIONS

State Intellectual Property Office of PRC Notification of First Office Action and English Translation, issued Jul. 1, 2015, regarding Application No. 201210305469.7, 13 pages.
(Continued)

*Primary Examiner* — James Hook
(74) *Attorney, Agent, or Firm* — Yee & Associates, P.C.

(57) ABSTRACT

A method and apparatus for insulating a fluid line in a container configured to contain a fluid. The apparatus comprises a container, a fluid line in the container, and a tube. The container is configured to contain a fluid. The tube is placed around the fluid line in the container to form a channel around a first portion of the fluid line. The tube is configured to contain the fluid from the container in the channel and to prevent a first flow of the fluid between the container and the channel except through a number of ends of the tube. The tube is further configured to reduce a second flow of the fluid within the channel such that the fluid in the channel insulates the fluid line.

18 Claims, 11 Drawing Sheets

(51) Int. Cl.
*B64D 37/34* (2006.01)
*F16L 59/02* (2006.01)
*F16L 59/14* (2006.01)

(52) U.S. Cl.
CPC .... *Y10T 29/49826* (2015.01); *Y10T 137/2496* (2015.04)

(56) References Cited

U.S. PATENT DOCUMENTS

| | | | |
|---|---|---|---|
| 2,382,512 A | 8/1945 | Simon | |
| 2,676,773 A | 4/1954 | Sanz et al. | |
| 2,756,032 A * | 7/1956 | Dowell | F28D 21/0008 138/114 |
| 3,126,918 A * | 3/1964 | Eaton | F16L 59/12 138/113 |
| 3,556,199 A | 1/1971 | Groote | |
| 3,595,299 A * | 7/1971 | Weishaupt | F17C 9/02 138/38 |
| 3,907,028 A * | 9/1975 | Lawson | F28D 7/022 138/38 |
| 4,351,366 A | 9/1982 | Anglioletti | |
| 4,497,365 A * | 2/1985 | Boyer | F28D 7/106 165/154 |
| 4,840,025 A | 6/1989 | Coffinberry | |
| 5,143,152 A * | 9/1992 | Catelli | F28D 7/103 165/154 |
| 5,374,476 A | 12/1994 | Horsley | |
| 5,400,602 A | 3/1995 | Chang et al. | |
| 5,501,196 A | 3/1996 | Brunnhofer | |
| 5,552,576 A | 9/1996 | Giamati | |
| 5,601,894 A * | 2/1997 | Maruschak | A61M 5/44 138/110 |
| 6,026,862 A | 2/2000 | Friedrich et al. | |
| 6,595,241 B2 * | 7/2003 | Chen | F16L 53/00 138/148 |
| 6,830,075 B1 | 12/2004 | McKinney et al. | |
| 6,889,937 B2 | 5/2005 | Simpson et al. | |
| 7,156,126 B2 * | 1/2007 | Topek | F16L 7/00 138/108 |
| 8,056,934 B2 | 11/2011 | Ono | |
| 2002/0189695 A1 * | 12/2002 | Chen | F16L 53/00 138/38 |
| 2003/0221734 A1 * | 12/2003 | Bauer | F24J 2/055 138/38 |
| 2006/0131884 A1 * | 6/2006 | Inoue | F02M 37/0017 285/420 |
| 2008/0149208 A1 * | 6/2008 | Kurara | F16L 59/135 138/106 |
| 2009/0014163 A1 | 1/2009 | Thomas | |
| 2009/0178723 A1 | 7/2009 | Cioffi | |
| 2009/0260706 A1 | 10/2009 | Hesse et al. | |
| 2010/0288244 A1 | 11/2010 | Bulin et al. | |
| 2013/0006336 A1 * | 1/2013 | Kulstad | A61F 7/12 607/105 |
| 2013/0048134 A1 | 2/2013 | Holbrook et al. | |

FOREIGN PATENT DOCUMENTS

| | | |
|---|---|---|
| JP | S53117813 A | 10/1978 |
| JP | S5965694 A | 4/1984 |
| JP | 2002295788 A | 10/2002 |

OTHER PUBLICATIONS

Notice of Reasons for Rejection regarding Japanese Patent Application No. 2012-185297, issued Jun. 21, 2016, 6 pages.

* cited by examiner

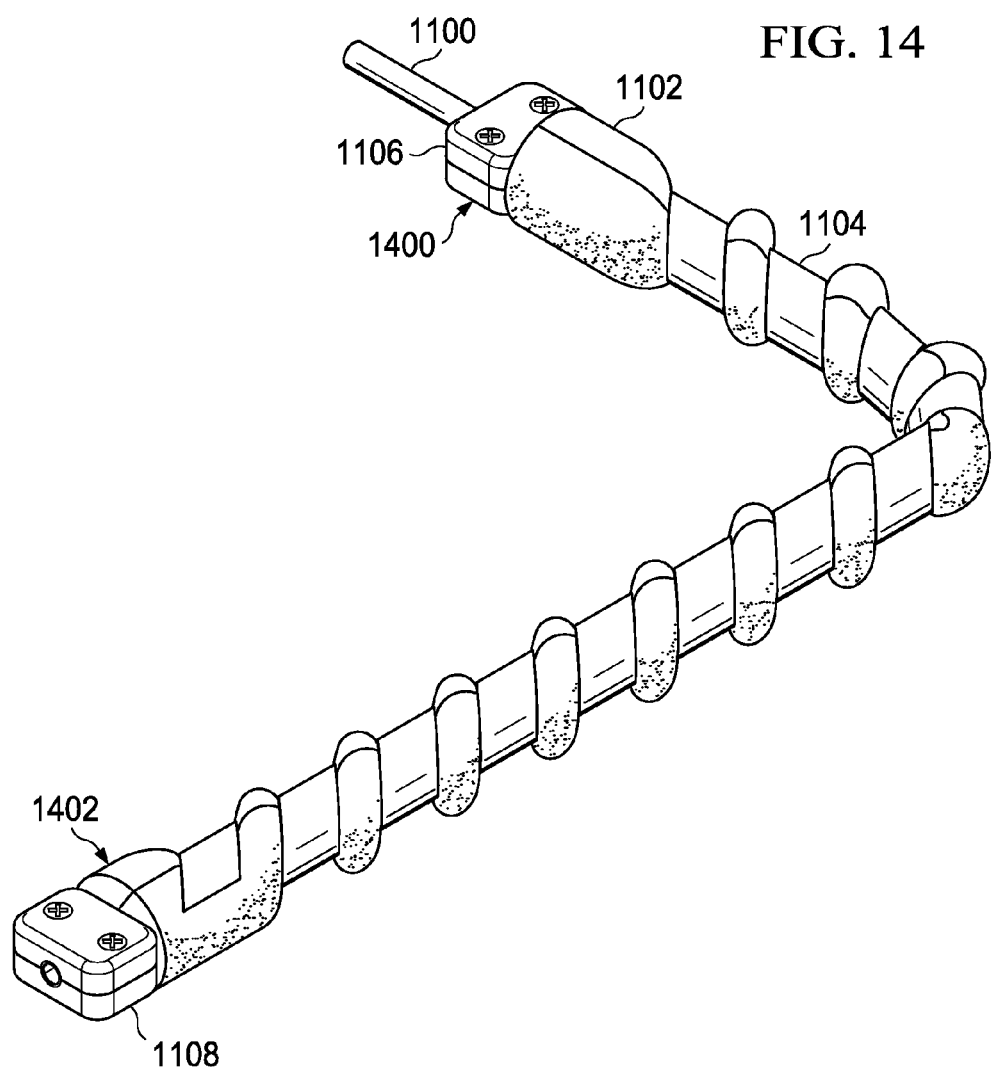

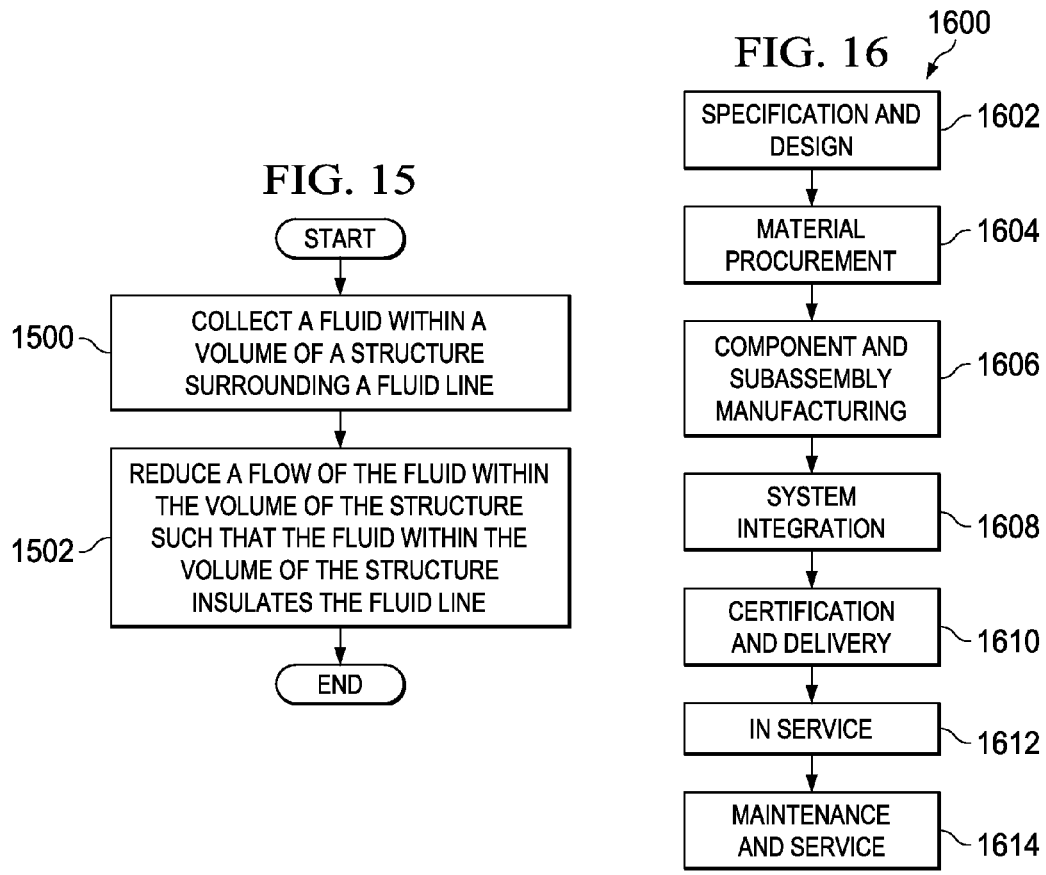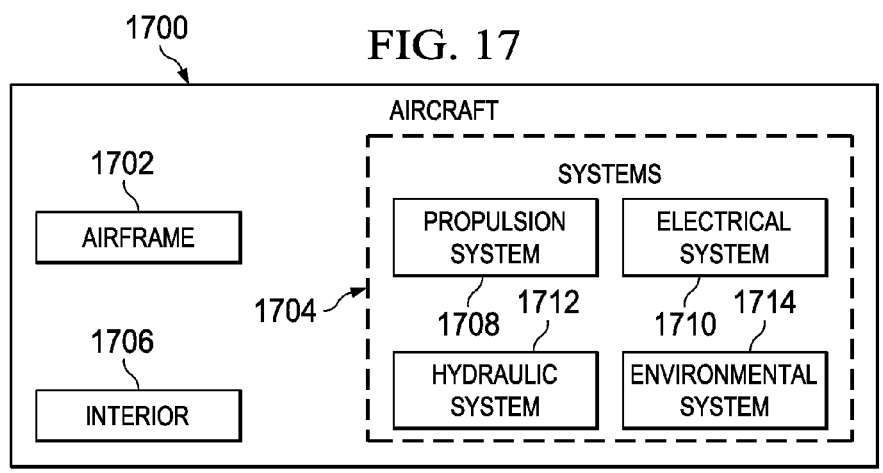

STAGNANT FUEL THERMAL INSULATION SYSTEM

This application is a divisional of U.S. patent application Ser. No. 13/217,523, filed Aug. 25, 2011.

BACKGROUND INFORMATION

1. Field

The present disclosure relates generally to insulating systems and in particular to insulating fluid lines in an aircraft. Still more particularly, the present disclosure relates to a method and apparatus for insulating hydraulic fluid in a fluid line within a fuel tank of an aircraft.

2. Background

Aircraft are complex structures containing many different systems. For example, an aircraft may include an airframe that provides support for various systems. These systems may include, for example, without limitation, a propulsion system, an electrical system, an environmental system, a hydraulic system, a fuel system, and other suitable types of systems. Further, many electrical lines and fluid lines for these and other systems are also present in an aircraft. For example, an aircraft may have several miles of electrical and fluid lines.

In one illustrative example, a fluid line for a hydraulic system may carry a hydraulic fluid. This fluid line may extend through the wing of an aircraft to provide hydraulic fluid to various components in the aircraft, such as control surfaces. For example, the hydraulic fluid may be used to operate control surfaces, such as flaps and ailerons, and other components, such as landing gear, as well as other suitable types of components.

Fluids carried by the different fluid lines in an aircraft may include fuel, hydraulic fluid, water, and other suitable fluids. These different types of fluids have different temperature ranges that are desired for operation. For example, operating different devices with hydraulic fluid in a hydraulic system may require the hydraulic fluid to flow through a fluid line in the hydraulic system with a desired level of pressure. If the temperature of the hydraulic fluid fails out of a desired range, then the hydraulic fluid may not flow through the fluid line with the desired level of pressure and/or the desired flow race.

Insulation systems may be added to the aircraft, to maintain a desired temperature range for different fluids flowing through fluid lines in the aircraft. The different types of insulation systems may be more complex, costly, or difficult to use than desired.

Therefore, it would be advantageous to have a method and apparatus that takes into account at least some of the issues discussed above as well as possibly other issues.

SUMMARY

In one advantageous embodiment, an apparatus comprises a container, a fluid line in the container, and a tube. The container is configured to contain a fluid. The tube is placed around the fluid line in the container to form a channel around a first portion of the fluid line. The tube is configured to contain the fluid from the container in the channel and to prevent a first flow of the fluid between the container and the channel except through a number of ends of the tube. The tube is further configured to reduce a second flow of the fluid within the channel such that the fluid in the channel insulates the fluid line.

In another advantageous embodiment, a tube comprises diametrical cross sections from a first end of the tube to a second end of the tube. Each diametrical cross-section in the diametrical cross-sections comprises a C-shape. An inner surface of the tube defines a first channel. An outer surface of the tube defines a second channel. The first channel is from the first end of the tube to the second end of the tube. The second channel is from the first end of the tube to the second end of the tube. The channel is a portion of a circumference of the each diametrical cross-section comprising the C-shape. The second channel is a hole in the C-shape of the each diametrical cross-section within the first channel. The tube has a flexibility that allows the second channel to receive a fluid line through an opening in the C-shape of the each diametrical cross-section.

In yet another advantageous embodiment, a method for insulating a fluid line in a container configured to contain a fluid is provided. A tube is placed around the fluid line in the container to form a channel around a first portion of the fluid line. The tube is configured to contain the fluid from the container in the channel and to prevent a first flow of the fluid between the container and the channel except through a number of ends of the tube. The tube is further configured to reduce a second flow of the fluid within the channel such that the fluid in the channel insulates the fluid line.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives, and advantages thereof, will best be understood by reference to the following detailed description of an advantageous embodiment of the present disclosure when read in conjunction with the accompanying drawings, wherein:

FIG. 14 is another illustration fox a process for insulating a fluid line in accordance with an advantageous embodiment;

FIG. 15 is an illustration of a flowchart of a process for insulating a fluid line in accordance with an advantageous embodiment;

FIG. 16 is an illustration of an aircraft manufacturing and service method in accordance with an advantageous embodiment; and FIG. 17 is an illustration of an aircraft which an advantageous embodiment may be implemented.

DETAILED DESCRIPTION

The different advantageous embodiments recognize and take into account one or more different considerations. For example, the different advantageous embodiments recognize and cake into account that a fluid line for a particular system may extend through other systems in an aircraft. For example, without limitation, a fluid line carrying hydraulic fluid may extend through the wing of an aircraft. The fluid line may foe connected to various components associated with the wing. These components may include, for example, an aileron, a flap, a landing gear assembly, and other suitable components.

The different advantageous embodiments recognize and take into account that the fluid line also may extend through a fuel rank in the aircraft. The different advantageous embodiments recognize and take into account that the fuel in the fuel tank may have temperatures as low as about −40 degrees during flight or when the fuel sits within the fuel tank overnight. The different advantageous embodiments recognize and take into account that if the temperature of the hydraulic fluid in the hydraulic line becomes too low, the hydraulic fluid may not flow as desired.

Additionally, the different advantageous embodiments recognize and cake into account that one solution may be to use fluid lines with a larger diameter. The different advantageous embodiments also recognize and take into account that another solution may be to include structures that may fill with fluid to provide an insulator. In these examples, the fluid may be fuel in the fuel tank. However, the different advantageous embodiments recognize and take into account that using fluid lines with a larger diameter and/or structures that may fill with fuel may reduce the amount of usable fuel held within the fuel tank.

Thus, the different advantageous embodiments provide a method and apparatus for insulating fluid lines. In one advantageous embodiment, an apparatus comprises a structure configured to be placed around a fluid line. The structure is configured to reduce the flow of fluid in a volume within the structure. This reduction of the flow of fluid is such that the fluid in the volume insulates the fluid line.

In particular, this reduction of the flow of the fluid reduces convective currents in the fluid around the fluid line. This reduction of corrective currents in the fluid reduces the transfer of heat from a second fluid flowing in the fluid line to the fluid outside of the fluid line.

Figure 1:
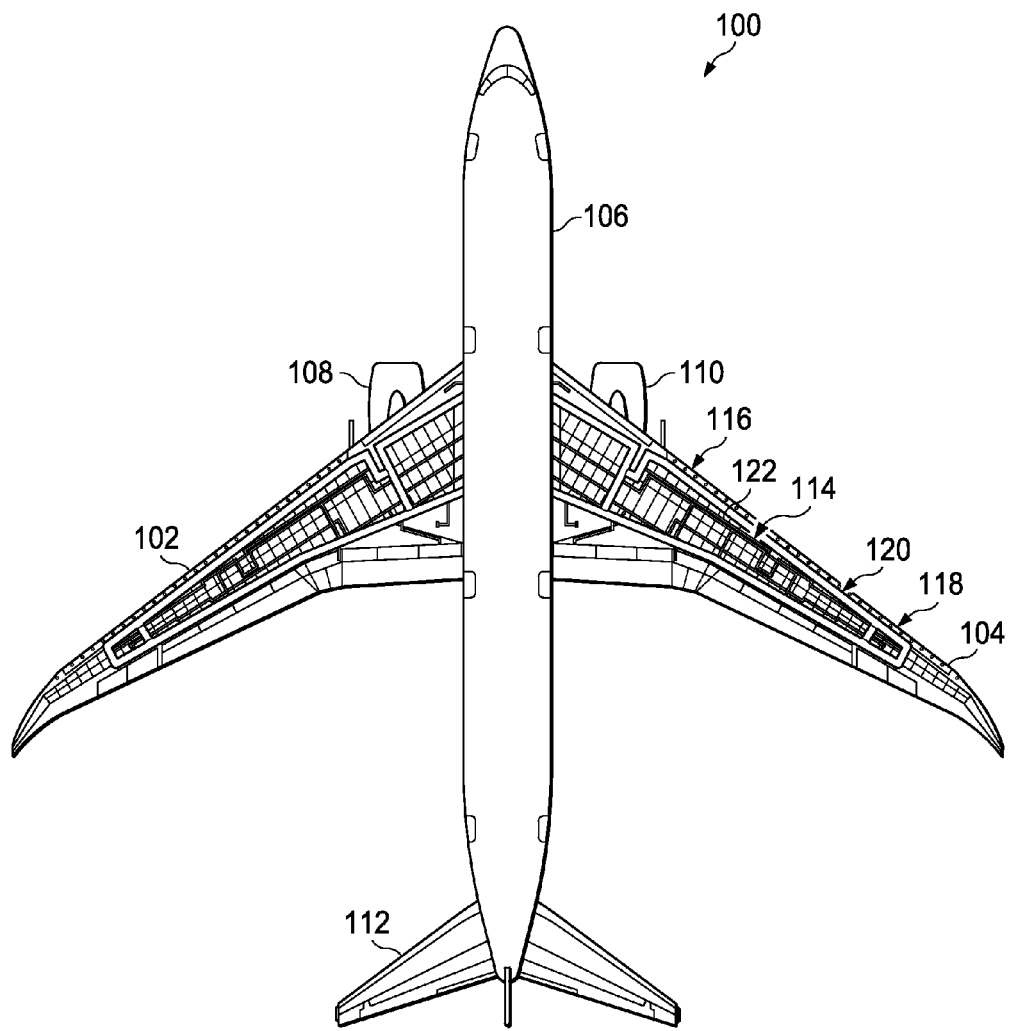
FIG. 1 is an illustration of an aircraft in accordance with an advantageous embodiment.

With reference now to the figures and, in particular, with reference to FIG. 1, an illustration of an aircraft is depicted in accordance with an advantageous embodiment. In this illustrative example, aircraft 100 is an example of one platform in which the different advantageous embodiments may be implemented. As depicted, aircraft 100 has wing 102 and wing 104 attached to fuselage 106. Aircraft 100 includes wing mounted engine 108, wing mounted engine 110, and tail 112.

Further, in this illustrative example, aircraft 100 has hydraulics system 114 and fuel system 116. Fuel system 116 includes fuel tanks 118 located within wing 102 and wing 104 and fuel, lines 120 within wing 102 and wing 104. Hydraulics system 114 includes hydraulic fluid lines 122 also within wing 102 and wing 104. As depicted, hydraulic fluid lines 122 extend through fuel tanks 118.

In this illustrative example, fuel tanks 118 are configured to hold fuel for aircraft 100. The fuel in fuel tanks 118 may have a temperature that is different from the temperature of hydraulic fluid flowing through hydraulic fluid lines 122. For example, the fuel may have a temperature of about minus 40 degrees Fahrenheit. As a result, fuel in fuel tanks 118 may change the temperature of the hydraulic fluid. In one advantageous embodiment, an insulation system is provided that may foe used to insulate hydraulic fluid lines 122 in hydraulics system 114. In particular, the insulation system may reduce a transfer of heat between the hydraulic fluid in hydraulic fluid lines 122 and the fuel in fuel tanks 118. This type of insulation is referred to as thermal insulation.

Figure 2:
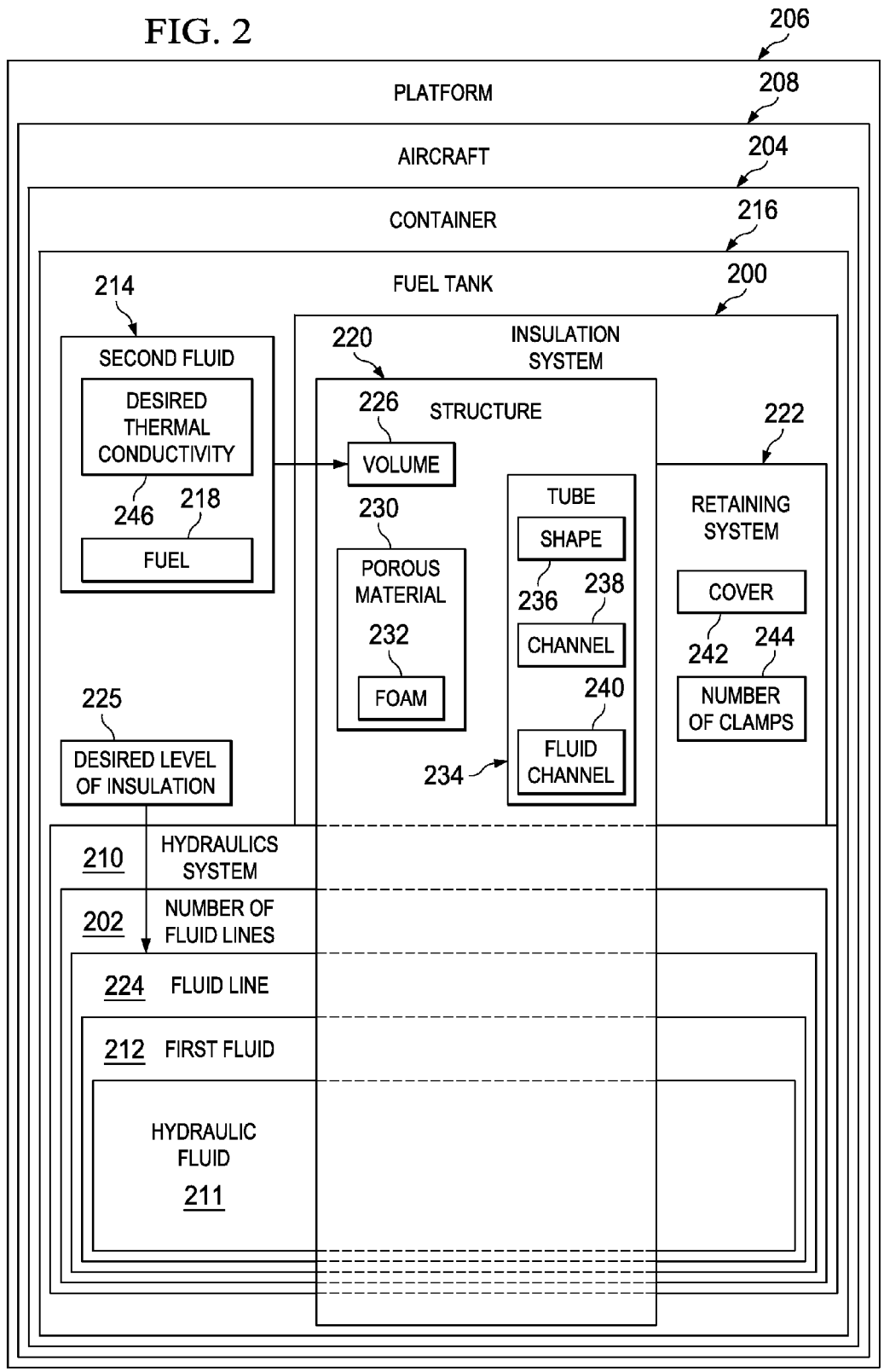
FIG. 2 is an illustration of an insulation system in the form of a block diagram in accordance with an advantageous embodiment.

With reference now to FIG. 2, an illustration of an insulation system in the form of a block diagram is depicted in accordance with an advantageous embodiment. In these illustrative examples, insulation system 200 may be used to insulate number of fluid lines 202. As used herein, a number of items means one or more items. For example, a number of fluid lines means one or more fluid lines.

In one illustrative example, number of fluid lines 202 is located inside of container 204. Number of fluid lines 202 and container 204 may be located in platform 206. In these illustrative examples, platform 206 takes the form of aircraft 208. Further, in one illustrative example, number of fluid lines 202 may be implemented in hydraulics system 210 in aircraft 208. Hydraulics system 114 in aircraft 100 in FIG. 1 may be an example of one implementation for hydraulics system 210 in aircraft 208.

As depicted, number of fluid lines 202 is configured to carry first fluid 212. When number of fluid lines 202 is in hydraulics system 210, first fluid 212 takes the form of hydraulic fluid 211. In other illustrative examples, first fluid 212 may take the form of water, air, a gas, a coolant, or some other suitable type of fluid.

Further, container 204 is configured to hold second fluid 214. In one illustrative example, container 204 may take the form of fuel tank 216 in aircraft 208 in these illustrative examples. Fuel tanks 118 in FIG. 1 may be an example of one implementation for fuel tank 216. When container 204 is fuel tank 216, second fluid 214 takes the form of fuel 218.

In these illustrative examples, insulation system 200 is configured to insulate number of fluid lines 202 inside of container 204. As depicted, insulation system 200 includes at least one of structure 220 and retaining system 222.

As used herein, the phrase "at least one of", when used with a list of items, means different combinations of one or more of the listed items may be used and only one of each item in the list may be needed. For example, "at least one of item A, item B, and item C" may include, for example, without limitation, item A or item A and item B. This example also may include item A, item E, and item C, or item B and item C.

Structure 220 is configured to be placed around one or more of number of fluid lines 202. For example, fluid line 224 is an example of one of number of fluid lines 202 in container 204. In one illustrative example, structure 220 may be configured to be placed around fluid line 224 in container 204.

When second fluid 214 is present in container 204, structure 220 may foe immersed in second fluid 214, depending on the level of second fluid 214 within container 204. When structure 220 is at least partially immersed in second fluid 214 in container 204, structure 220 retains second fluid 214. In particular, structure 220 retains second fluid 214 within volume 226 of structure 220.

In these illustrative examples, structure 220 may have a shape configured such that at least a portion of second fluid 214 within volume 226 of structure 220 and/or at least a portion of structure 220 is in direct-contact with fluid line 224. This direct contact may occur when structure 220 is placed around fluid line 224 and at least partially immersed in second fluid 214 in container 204.

Further, when second fluid 214 is present within volume 226 of structure 220, second fluid 214 insulates fluid line 224. In this manner, second fluid 214 may have a secondary purpose in addition to its primary purpose in container 204.

For example, when second fluid 214 takes the form of fuel 218, the primary purpose of second fluid 214 is additional fuel for the operation of aircraft 208. Structure 220 may take advantage of the presence of second fluid 214 within container 204 and use second fluid 214 for the secondary purpose of insulating fluid line 224.

For example, when second fluid 214 in container 204 is fuel 218 having a temperature of about minus 40 degrees Fahrenheit, structure 220 is configured to hold second fluid 214 within volume 226 such that second fluid 214 in volume 226 of structure 220 insulates fluid line 224 to maintain a desired temperature for fluid line 224.

Additionally, structure 220 is configured such that second, fluid 214 may flow out of volume 226 when the level of second fluid 214 in container 204 is lowered. In this manner, substantially all of second fluid 214 may flow out of volume 226 of structure 220 when structure 220 is no longer immersed in second fluid 214 in container 204. As a result, second fluid 214 in volume 226 may be usable for its primary purpose.

As one illustrative example, when second fluid 214 is fuel 218 inside container 204 in the form of fuel tank 216 inside aircraft 208, fuel 218 may flow into volume 226 of structure 220 while fuel tank 216 is being refueled. Further, fuel 218 may be retained within volume 226 during operation of aircraft 208. As the level of fuel 218 within fuel tank 216 lowers during operation of aircraft 208, fuel 218 within volume 226 may flow out of volume 226 of structure 220 and into the rest of fuel 218 in fuel tank 216.

In this manner, fuel 218 that is held within volume 226 of structure 220 may be used both for insulating fluid line 224 and operating aircraft 208. As a result, additional amounts of fuel 218 do not need to be added to fuel tank 216 of aircraft 208 for the purpose of insulating fluid line 224.

Structure 220 is configured to enclose and/or trap a portion of second, fluid 214 within volume 226 of structure 220 such that second fluid 214 insulates fluid line 224. Further, structure 220 may reduce a flow of this portion of second fluid 214 within volume 226 of structure 220. This flow may be measured as, for example, a flow rate. The flow of second fluid 214 within volume 226 may foe caused by a convective current through second fluid 214 in container 204. In particular, the flow of second fluid 214 in volume 226 of structure 220 may be reduced such that second fluid 214 in volume 226 around fluid line 224 provides desired level of insulation 225.

In one illustrative example, this reduction in the flow may be such that the flow of second fluid 214 is substantially stagnant. In these illustrative examples, when a fluid is substantially stagnant, the flow of the fluid may be substantially absent and/or slow enough to provide desired level of insulation 225 for fluid line 224. For example, when the flow of second fluid 214 within volume 226 is reduced, the transfer of heat between first fluid 212 in fluid line 224 and second fluid 214 outside of structure 220 may also be reduced.

In these illustrative examples, when the flow of second fluid 214 within volume 226 is reduced, second fluid 214 inside volume 226 in structure 220 around fluid line 224 reduces the transfer of heat from first fluid 212 to second fluid 214 outside of structure 220 within container 204. Of course, in other illustrative examples, the flow of second fluid 214 may be reduced such that second fluid 214 inside volume 226 in structure 220 around fluid line 224 reduces the transfer of heat, from second fluid 214 outside of structure 220 in container 204 to first fluid 212 inside fluid line 224.

Structure 220 may take a number of different, forms in these illustrative examples. For example, in one illustrative example, structure 220 may take the form of porous material 230. Porous material 230 may be any material, configured to hold second fluid 214 within volume 226 of porous material 230. Porous material 230 may be comprised of cells that may be filled with a fluid, such as second fluid 214. In particular, when porous material 230 is at least partially immersed in second fluid 214, second fluid 214 may fill at least part of volume 226 within porous material 230.

Additionally, porous material 230 may be configured to retain second fluid 214 within volume 226 such that second fluid 214 has a flow that is slow enough to provide desired level of insulation 225 for fluid line 224. For example, second fluid 214 within volume 226 of porous material 230 may be considered substantially stagnant. In this manner, a connective current in second fluid 214 within volume 226 of porous material 230 may be reduced and/or eliminated to provide desired level of insulation 225 for fluid line 224.

In some illustrative examples, the convective current may be tailored to provide desired level of insulation 225 for fluid line 224. In other words, the type of porous material 230 used, volume 226 selected for porous material 230, and/or other parameters may be selected such that the convective current in second fluid 214 is low enough, to provide desired level of insulation 225 for fluid, line 224.

Further, in these illustrative examples, porous material 230 is also configured to allow second fluid 214 to flow out of volume 226 of porous material 230. For example, when a level of second fluid 214 in container 204 lowers, less of porous material 230 may be immersed in second fluid 214. As a result, second fluid 214 may drain out of volume 226 of porous material 230 as the level of second fluid 214 in container 204 lowers.

In one illustrative example, porous material 230 may take the form of foam 232. Foam 232 may have a matrix structure of cells that allows second fluid 214 to flow into foam 232, fill volume 226 within foam 232, and flow out of foam 232. When used with hydraulics system 210 in aircraft 208, foam 232 may have an open cell structure with about 45 cells per inch and a porosity of about 93 percent. Further, in this illustrative example, foam 232 may have a thickness of about 0.2 inches.

In these illustrative examples, porous material 230 may be comprised of any material that is configured to allow second fluid 214 to flow into volume 226 of porous material 230, be retained within volume 226 of porous material 230, and flow out of volume 226 of porous material 230. For example, porous material 230 may be comprised of a material selected from at least one of a foamed polyurethane, a polysulfide, epoxy plastic, a metallic mesh screen, a plastic expandable mesh, a woven fabric, and other suitable types of materials.

Additionally, in other illustrative examples, structure 220 may take the form of tube 234. Tube 234 is configured to be placed around fluid line 224. As one illustrative example, tube 234 has shape 236 and defines channel 238. Shape 236 may be selected to allow fluid line 224 to fit within channel 238.

In one illustrative example, shape 236 may be a C-shape, a U-shape, or some other suitable shape that allows channel 238 to be formed outside of a surface of tube 234. For example, a portion of the surface of tube 234 may be bent inwards of tube 234 to form channel 238 that is capable of receiving fluid line 224 within channel 238. For example, channel 238 may function as a guide for fluid line 224.

In particular, tube 234 with this type of shape may be comprised of a flexible material that allows tube 234 to foe placed around fluid line 224 without needing to slide around fluid line 224. For example, the material of tube 234 and shape 236 of tube 234 may be selected such that tube 234 may be, for example, clipped or otherwise attached to fluid line 224.

Additionally, with this type of shape, tube 234 also has fluid channel 240 inside tube 234. Fluid channel 240 may be configured to allow second fluid 214 to flow into volume 226 within fluid channel 240. The openings to fluid channel 240 at the ends of tube 234 may be at least partially closed and/or blocked such that second fluid 214 within volume 226 in fluid channel 240 may have a flow that is slow enough to provide desired level of insulation 225.

In another illustrative example, tube 234 may have shape 236 that allows tube 234 to be placed around fluid line 224 from an end of fluid line 224. Tube 234 may then be slid down the length of fluid line 224 to position tube 234 with respect to fluid line 224 to provide desired level of insulation 225 for fluid line 224.

In some illustrative examples, structure 220 may be positioned with respect to fluid line 224 using retaining system 222. Retaining system 222 may include, for example, cover 242. Cover 242 may be any structure or material configured to hold structure 220 in a desired position around fluid line 224.

For example, cover 242 may take the form of a plastic skin that may be wrapped around porous material 230 once porous material 230 has been placed around, fluid line 224. This plastic skin may hold porous material 230 in substantially the same position around fluid line 224.

In another illustrative example, retaining system 222 may include number of clamps 244. Number of clamps 244 may be configured to hold structure 220 around fluid line 224. For example, number of clamps 244 may be configured to hold porous material 230 in place around structure 220. In some illustrative examples, number of clamps 244 may be placed around fluid line 224 and configured to substantially prevent structure 220 from moving along a length of fluid line 224.

In these illustrative examples, second fluid 214 in the form of fuel 218 has desired thermal conductivity 246. Desired thermal conductivity 246 may be low enough such that the transfer of heat between first fluid 212 in fluid line 224 and second fluid 214 in volume 226 of structure 220 is reduced and/or eliminated. Of course, in other illustrative examples, second fluid 214 may be some other suitable type of fluid selected such that the thermal conductivity of second fluid 214 is desired thermal conductivity 246. Second fluid 214 may be selected such that the thermal conductivity of second fluid 214 provides desired, level of insulation 225 for fluid line 224.

The illustration of insulation system 200 in FIG. 2 is not meant to imply physical or architectural limitations to the manner in which an advantageous embodiment may be implemented. Other components in addition to and/or in place of the ones illustrated may be used. Some components may be unnecessary. Also, the blocks are presented to illustrate some functional components. One or more of these blocks may be combined and/or divided into different blocks when implemented in an advantageous embodiment.

For example, in other illustrative examples, insulation system 200 may include additional structures in addition to, and/or in place of, structure 220 for insulating number of fluid lines 202 in container 204. In some illustrative examples, structure 220 may be configured to insulate more than one fluid line in number of fluid lines 202. For example, structure 220 may be placed around fluid line 224 and another fluid line, as well as around a joint between these two fluid lines.

Further, platform 206 may take other forms other than aircraft 208. For example, platform 206 may be selected from one of a mobile platform, a stationary platform, a land-based structure, an aquatic-based structure, a space-based structure, an aircraft, an unmanned aerial vehicle, a helicopter, a submarine, a bus, a personnel carrier, a tank, a train, an automobile, a spacecraft, a space station, a satellite, a surface ship, a power plant, a dam, a manufacturing facility, a piece of equipment, a building and/or some other suitable type of platform.

In particular, platform 206 may be any platform that requires insulation of a first type of fluid in a number or fluid lines from thermal effects in response to the immersion of the number of fluid lines in a second type of fluid. For example, platform 206 may be any piece of equipment or machinery in which fluid lines are used.

The different components shown in FIGS. 1 and 3-14 may be combined with components in FIG. 2, used with components in FIG. 2, or a combination of the two. Additionally, some of the components in FIGS. 1 and 3-14 may be illustrative examples of how components shown in block form in FIG. 2 can be implemented as physical structures.

Figure 3:
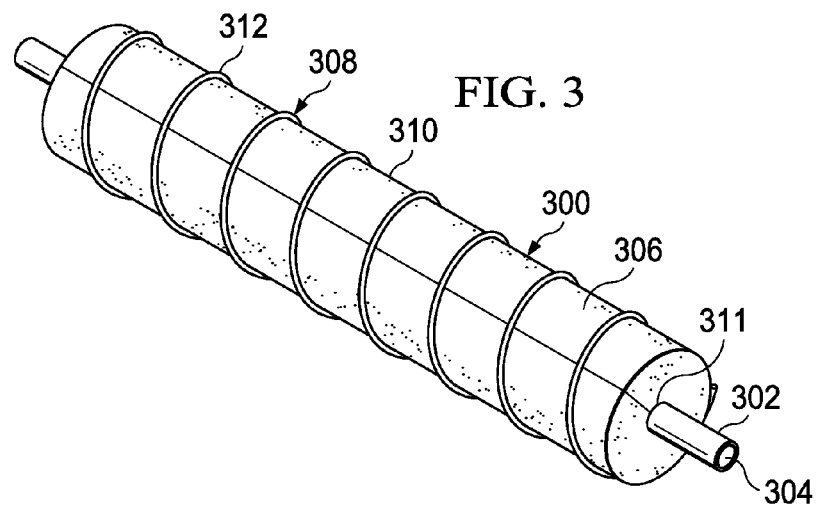
FIG. 3 is an illustration of an insulation system for a fluid line in accordance with an advantageous embodiment.

With reference now to FIG. 3, an illustration of an insulation system for a fluid line is depicted in accordance with an advantageous embodiment. In this illustrative example, insulation system 300 is configured to insulate fluid line 302. Fluid line 302 is an example one implementation for fluid line 224 in FIG. 2. Fluid line 302 has channel 304 that may be configured to carry a fluid, such as first fluid 212 in FIG. 2.

Insulation system 300 is an example of one implementation for insulation system 200 in FIG. 2. As depicted, insulation system 300 comprises structure 306 and retaining system 308. In this illustrative example, structure 306 takes the form of foam 310. Foam 310 is an example of one implementation for foam 232 in FIG. 2.

Foam 310 may have a shape that is substantially conformal to fluid line 302. In particular, inner surface 311 of foam 310 is substantially conformal to fluid line 302. In other words, when foam 310 is placed around fluid line 302, substantially all of inner surface 311 of foam 310 comes into contact with fluid line 302.

Additionally, foam 310 is a porous material that may allow a fluid, such as second fluid 214 in FIG. 2, to flow into foam 310 and be retained, within cells of foam 310. When foam 310 is placed around fluid line 302 and inner surface 311 of foam 310 is in contact with fluid line 302, at least a portion of the fluid retained within the cells of foam 310 is also in contact with fluid line 302.

In this illustrative example, retaining system 308 takes the form of support structure 312. Support structure 312, in this example, is a spiral-shaped plastic structure configured to wrap around foam 310. In particular, support structure 312 keeps foam 310 wrapped around fluid line 302. Further, support structure 312 holds foam 310 in its current position around fluid line 302.

Figure 4:
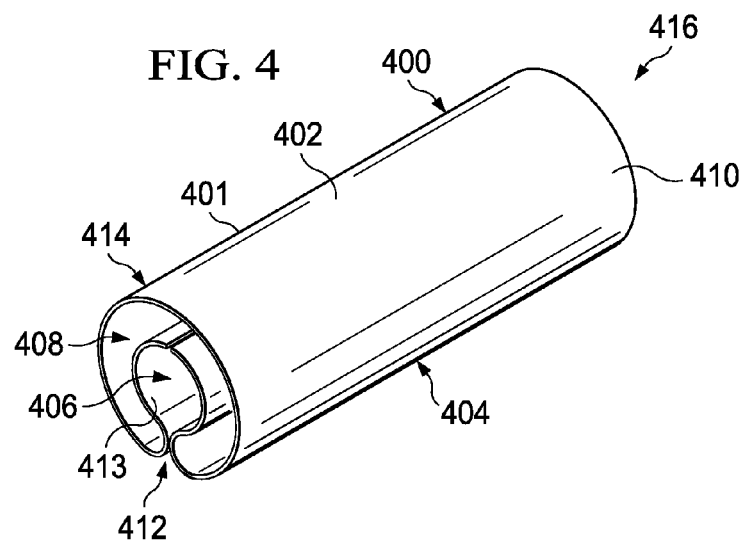
FIG. 4 is an illustration of another typo of insulation system in accordance with an advantageous embodiment.

With reference now to FIG. 4, an illustration of another type of insulation system is depicted in accordance with an advantageous embodiment. In this illustrative example, insulation system 400 includes structure 401. Structure 401 takes the form of tube 402. Tube 402 is an example of one implementation for tube 234 in FIG. 2.

As depicted, tube 402 has shape 404. Shape 404 is a C-shape in this illustrative example. Shape 404 for tube 402 forms channel 406 and fluid channel 408. Channel 406 is configured to receive a fluid line, such as fluid line 302 in FIG. 3. For example, tube 402 may be comprised of a material that has a flexibility that allows tube 402 to be placed around the fluid line. In particular, the fluid line may be received by channel 406 through opening 412. As depicted, when tube 402 is placed around the fluid line, inner surface 413 of channel 406 comes into contact with the fluid line.

Further, fluid channel 408 is located inside of tube 402. Fluid channel 408 is configured to carry a fluid, such as second fluid 214 in FIG. 2. As one illustrative example, fluid channel 408 may allow fuel in a fuel tank to flow into fluid channel 408 when tube 402 is placed around a fluid line in the fuel. In this example, when tube 402 is placed around the fluid line, end 414 and/or end 416 may be at least partially closed or blocked such that the flow of the fuel is reduced to provide a desired level of insulation for the fluid line.

Figure 5:
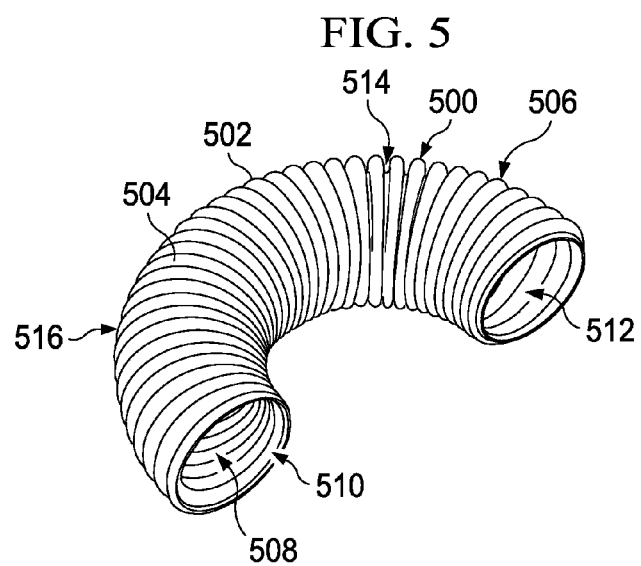
FIG. 5 is an illustration of another insulation system in accordance with an advantageous embodiment.

With reference now to FIG. 5, an illustration of an insulation system is depicted in accordance with an advantageous embodiment. In this illustrative example, insulation system 500 includes structure 502. Structure 502 takes the form of tube 504 in this depicted example. Tube 504 is an example of one implementation for tube 234 in FIG. 2.

As depicted, tube 504 has shape 506. Shape 506 is configured to allow a fluid line, such as fluid line 302 in FIG. 3, to be placed within channel 508 of tube 504. For example, end 510 or end 512 of tube 504 may be placed at an end of the fluid line and slid down the length of the fluid line to a desired position.

In this illustrative example, tube 504 has convoluted shape 514. Convoluted shape 514 comprises a series of coils or folds in tube 504. Convoluted shape 514 provides tube 504 with flexibility. In this manner, tube 504 may be placed around a fluid line and slid down the length of the fluid line, even around bends and/or turns in the fluid line.

When tube 504 is placed around the fluid line, a volume is formed between an inner surface of tube 504 and the fluid line. In one illustrative example, fuel in a fuel tank may flow into this volume when tube 504 is placed around a fluid line in the fuel. In this depicted example, when tube 504 is placed around the fluid line, end 510 and/or end 512 may be at least partially blocked such that the flow of the fuel is reduced to provide a desired level of insulation for the fluid line. However, end 510 and/or end 512 also may be left at least partially unblocked such that the fuel may flow into and out of the volume.

The illustrations of insulation system 300 in FIG. 3, insulation system 400 in FIG. 4, and insulation system 500 in FIG. 5 are not meant to imply physical or architectural limitations to the manner in which an advantageous embodiment may be implemented. For example, in other illustrative examples, a different type of retaining system may be used to hold foam 310 in FIG. 3 in place around, fluid line 302. For example, retaining system 308 may take the form of a plastic cover instead of support structure 312.

Figure 6:
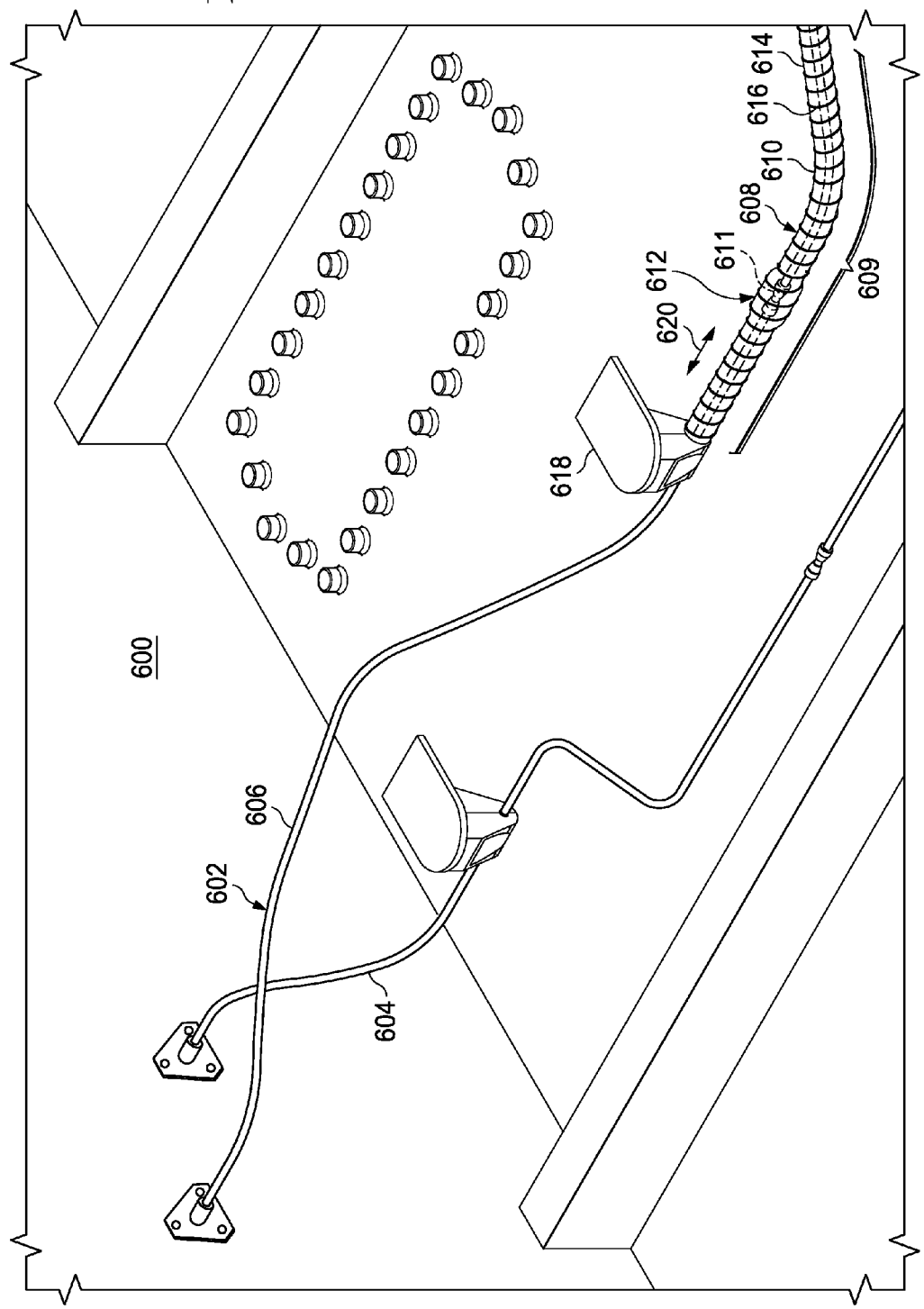
FIG. 6 is an illustration of an interior view of a fuel tank in accordance with an advantageous embodiment.

With reference now to FIG. 6, an illustration of an interior view of a fuel tank, is depicted in accordance with an advantageous embodiment. In this illustrative example, an interior view of fuel tank 600 is depicted. Fuel tank 600 is an example of one implementation for fuel tank 218 in FIG. 2. Fuel tank 600 is configured to hold fuel for an aircraft, such as aircraft 208 in FIG. 2.

As depicted, a portion of hydraulics system 602 is located inside fuel tank 600. In particular, fluid line 604 and fluid line 606 of hydraulics system 602 are located inside fuel tank 600. Fluid line 604 and fluid line 606 are configured to carry hydraulic fluid.

In this illustrative example, insulation system 608 has been placed around portion 609 of fluid line 606. As depicted, insulation system 608 includes structure 610 and retaining system 612. Structure 610 takes the form of foam 614 in this illustrative example. As depicted, foam 614 covers portion 609 of fluid line 606, which includes coupling 611. In this manner, foam 614 provides insulation for portion 609 of fluid line 606.

As illustrated, retaining system 612 includes spiral, structure 616 and clamp 618. Spiral structure 616 is configured to hold foam 614 in place around fluid line 606. Further, clamp 618 prevents foam 614 from moving in the direction of arrow 620 around fluid line 606. In this manner, retaining system 612 holds foam 614 in place around portion 609 of fluid line 606 to provide a desired level of insulation around portion 609 of fluid line 606.

Although, in this illustrative example, insulation system 608 has only been placed around portion 609 of fluid line 606, additional structures, such as structure 610 may be placed around other portions of fluid line 606 to insulate these other portions of fluid line 606. Further, structures similar to structure 610 may also be placed around fluid line 604.

Figure 7:
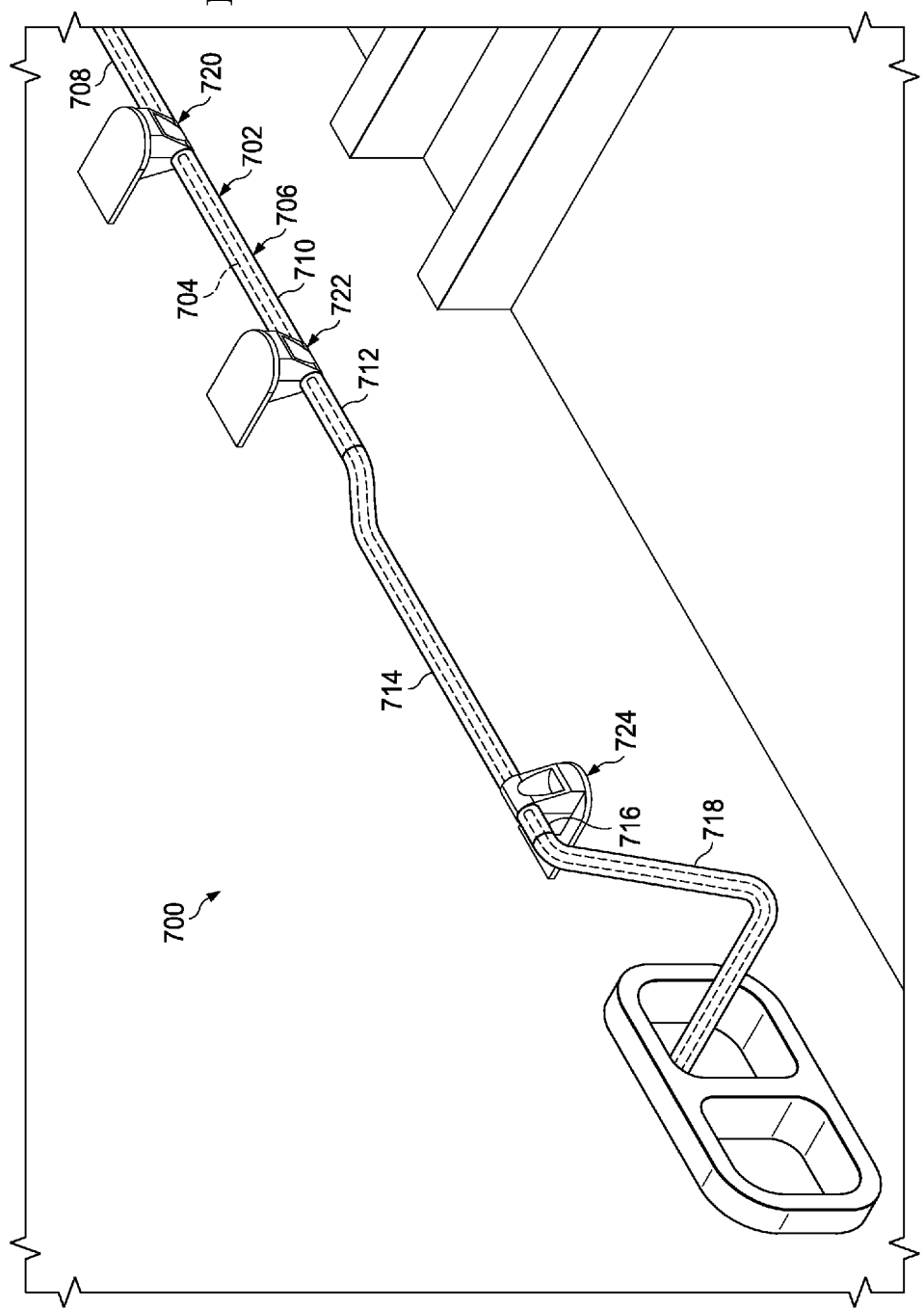
FIG. 7 is an illustration of an interior view of another fuel tank in accordance with an advantageous embodiment.

With reference now to FIG. 7, an illustration of an interior view of another fuel tank is depicted in accordance with an advantageous embodiment. In this illustrative example, an interior view of fuel tank 700 is depicted. Fuel tank 700 is an example of one implementation for fuel tank 216 in FIG. 2. Fuel tank 700 is configured to hold fuel for an aircraft, such as aircraft 208 in FIG. 2.

As depicted, a portion of hydraulics system 702 is located inside fuel tank 700. Fluid line 704 in hydraulics system 702 is located inside fuel tank 700. Fluid line 704 is configured to carry hydraulic fluid.

In this illustrative example, insulation system 706 has been placed around, fluid line 704. As depicted, insulation system 706 includes tubes 708, 710, 712, 714, 716, and 718. These tubes may have a shape similar to shape 404 in FIG. 4.

In this illustrative example, not all of fluid line 704 is covered by tubes 708, 710, 712, 714, 716, and 718. Fuel that may be present in fuel tank 700 may flow into fluid channels (not shown) inside tubes 708, 710, 712, 714, 716, and 718 at the exposed portions of fluid line 704. Although not ail of fluid line 704 is covered by tubes 708, 710, 712, 714, 716, and 718, these tubes provide a desired level of insulation for fluid line 704.

As depicted, clamps 720, 722, and 724 have been placed around fluid line 704. In some illustrative examples, these clamps may be part of insulation system 706. For example, clamps 720, 722, and 724 may be part of a retaining system configured to prevent tubes 708, 710, 712, 714, 716, and 718 from moving along a length of fluid line 704. In other illustrative examples, clamps 720, 722, and 724 may foe part of hydraulics system 702. When these clamps are part of hydraulics system 702, the lengths of tubes 708, 710, 712, 714, 716, and 718 fit between these clamps.

Figure 8:
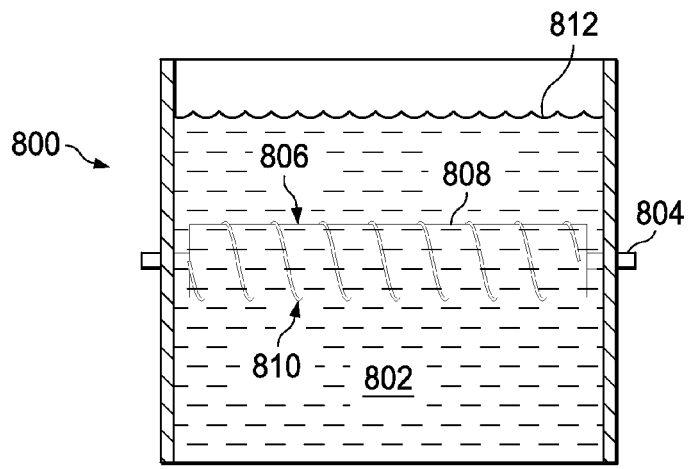
FIG. 8 is an illustration of a changing level of fluid inside a container in accordance with an advantageous embodiment.
Figure 9:
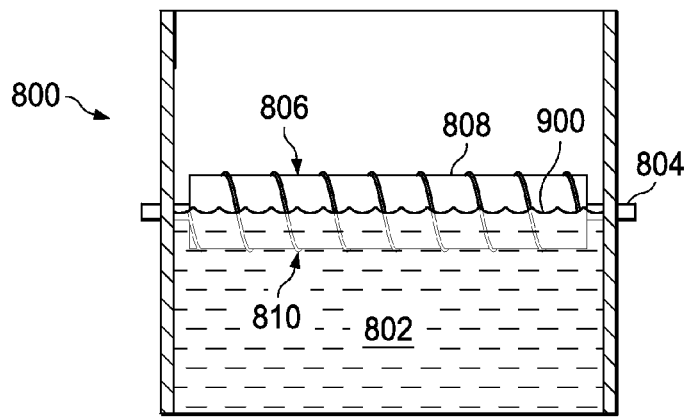
FIG. 9 is another illustration of a changing level of fluid inside a container in accordance with an advantageous embodiment.
Figure 10:
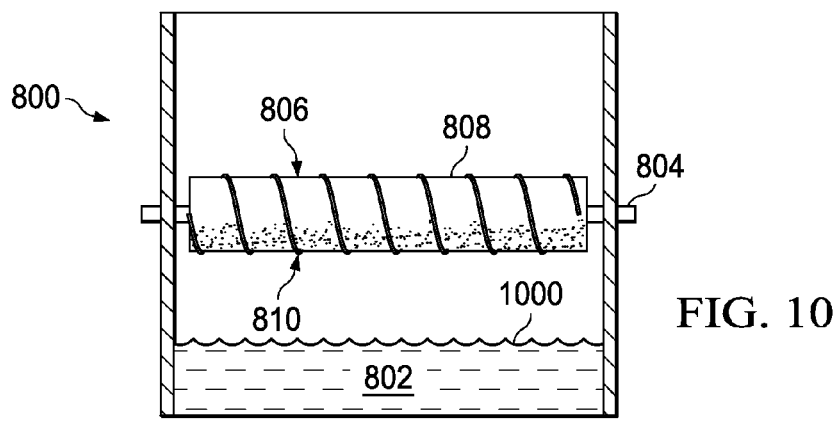
FIG. 10 is another illustration of a changing level of fluid inside a container in accordance with an advantageous embodiment.

With reference now to FIGS. 8-10, illustrations of a changing level of fluid inside a container are depicted in accordance with an advantageous embodiment. In these illustrative examples, container 800 is an example of one implementation for container 204 in FIG. 2. Container 800 holds fluid 802. Fluid 802 is an example of one implementation for second fluid 214 in FIG. 2.

With reference now to FIG. 8, fluid line 804 is present inside container 800. Fluid line 804 is configured to carry a fluid, such as hydraulic fluid. Insulation system 806 has been placed around fluid line 804 to insulate fluid line 804. In this illustrative example, insulation system 806 may be implemented using insulation system 300 from FIG. 3. In particular, insulation system 806 includes foam 808 and support structure 810.

As depicted, fluid 802 in container 800 is at level 812. When fluid 802 is at level 812, foam 808 is completely immersed in fluid 802. With this type of immersion of foam 808 in fluid 802, some of fluid 802 inside container 800 flows into the cells of foam 808. In this manner, fluid 802 fills at least a part of the volume of foam 808. Further, foam 808 is configured to retain fluid 802 and reduce a flow of fluid 802 in the volume of foam 808 to provide a desired level of insulation for fluid line 804.

With reference now to FIG. 9, the level of fluid 802 in container 800 has been lowered from level 812 in FIG. 8 to level 900. When fluid 802 is at level 900, foam 808 is only partially immersed in fluid 802 in container 800. In these illustrative examples, as the level of fluid 802 in container 800 is lowered from level 812 in FIG. 8 to level 900 in FIG. 9, the portion of foam 808 not immersed in fluid 802 may increase.

As the portion of foam 808 not immersed in fluid 802 increases, fluid 802 retained in foam 808 flows out of foam 808. In particular, fluid 802 retained in the upper portion of foam 808 that is no longer immersed in fluid 802 in container 800 may flow into the lower portion of foam 808 and/or out of foam 808 and into fluid 802 in container 800. Fluid 802 that flows from foam 808 and into fluid 802 remains usable for the primary purpose for which fluid 802 was intended.

With reference now to FIG. 10, the level of fluid 802 in container 800 has been lowered from level 900 in FIG. 9 to level 1000. When fluid 802 is at level 1000, foam 808 is no longer immersed in fluid 802 in container 800. As a result, any of fluid 802 that is still retained within foam 808 drains out of foam 808 into fluid 802 that is in container 800. In this manner, substantially ail of fluid 802 that flows into foam 808 remains usable for its primary purpose.

With reference now to FIGS. 11-14, illustrations for a process for insulating a fluid line are depicted in accordance with an advantageous embodiment. These steps may be implemented to insulate a fluid line, such as fluid line 224 in FIG. 2, using an insulation system, such as insulation system 200 in FIG. 2.

Figure 11:
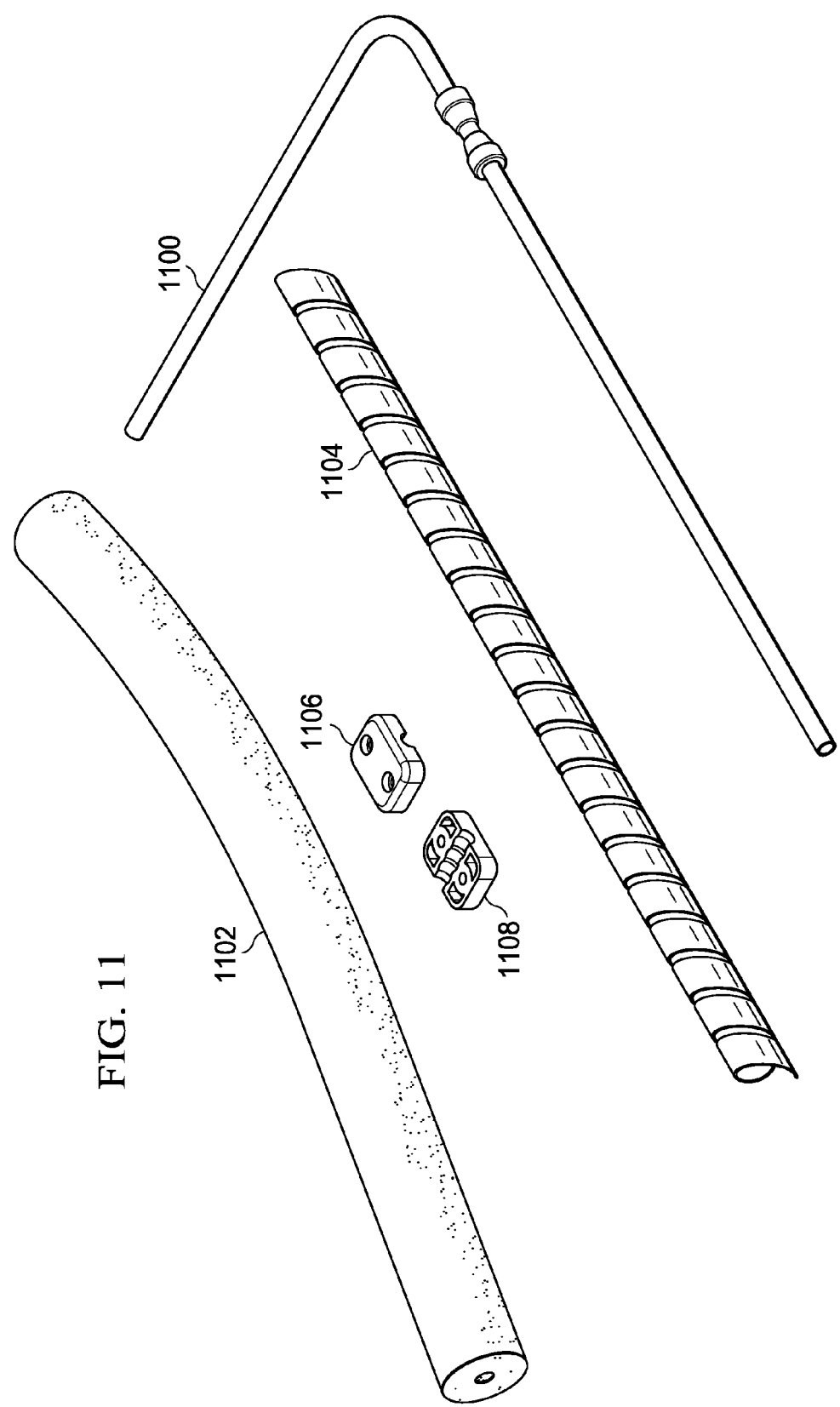
FIG. 11 is an illustration for a process for insulating a fluid line in accordance with an advantageous embodiment.

Turning now to FIG. 11, components used to insulate a fluid line are depicted in accordance with an advantageous embodiment. In this illustrative example, fluid line 1100 may be insulated using foam 1102, cover 1104, clamp 1106, and clamp 1108.

Foam 1102 is an example of one implementation for foam 232 in FIG. 2. Cover 1104 is an example of one implementation for cover 242 in FIG. 2. Further, clamp 1106 and clamp 1108 are an example of one implementation for number of clamps 244 in FIG. 2. When assembled, foam 1102, cover 1104, clamp 1106, and clamp 1108 may form an insulation system for fluid line 1100.

Figure 12:
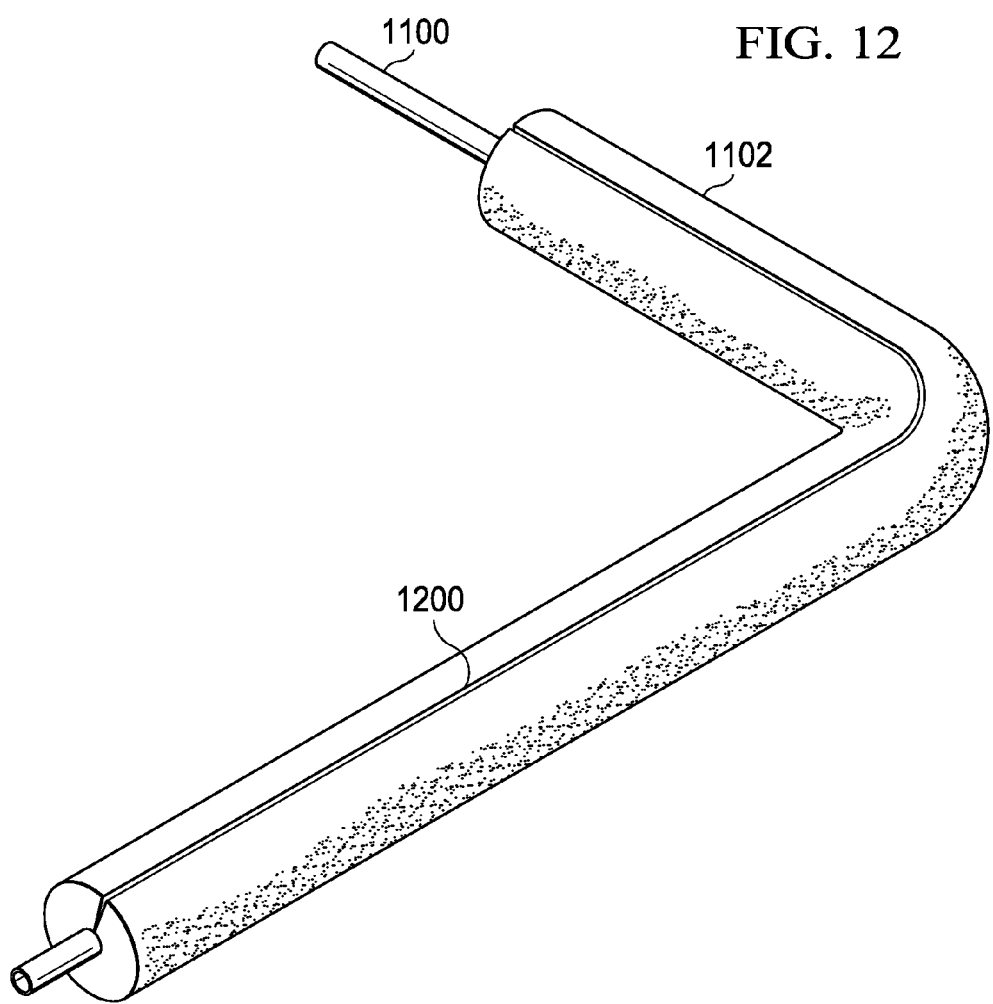
FIG. 12 is another illustration fox a process for insulating a fluid line in accordance with an advantageous embodiment.

With reference now to FIG. 12, foam 1102 has been placed around fluid line 1100. As depicted, foam 1102 has slit 1200 that allows foam 1102 to be placed around fluid line 1100. For example, foam 1102 may receive fluid line 1100 through slit 1200.

Figure 13:
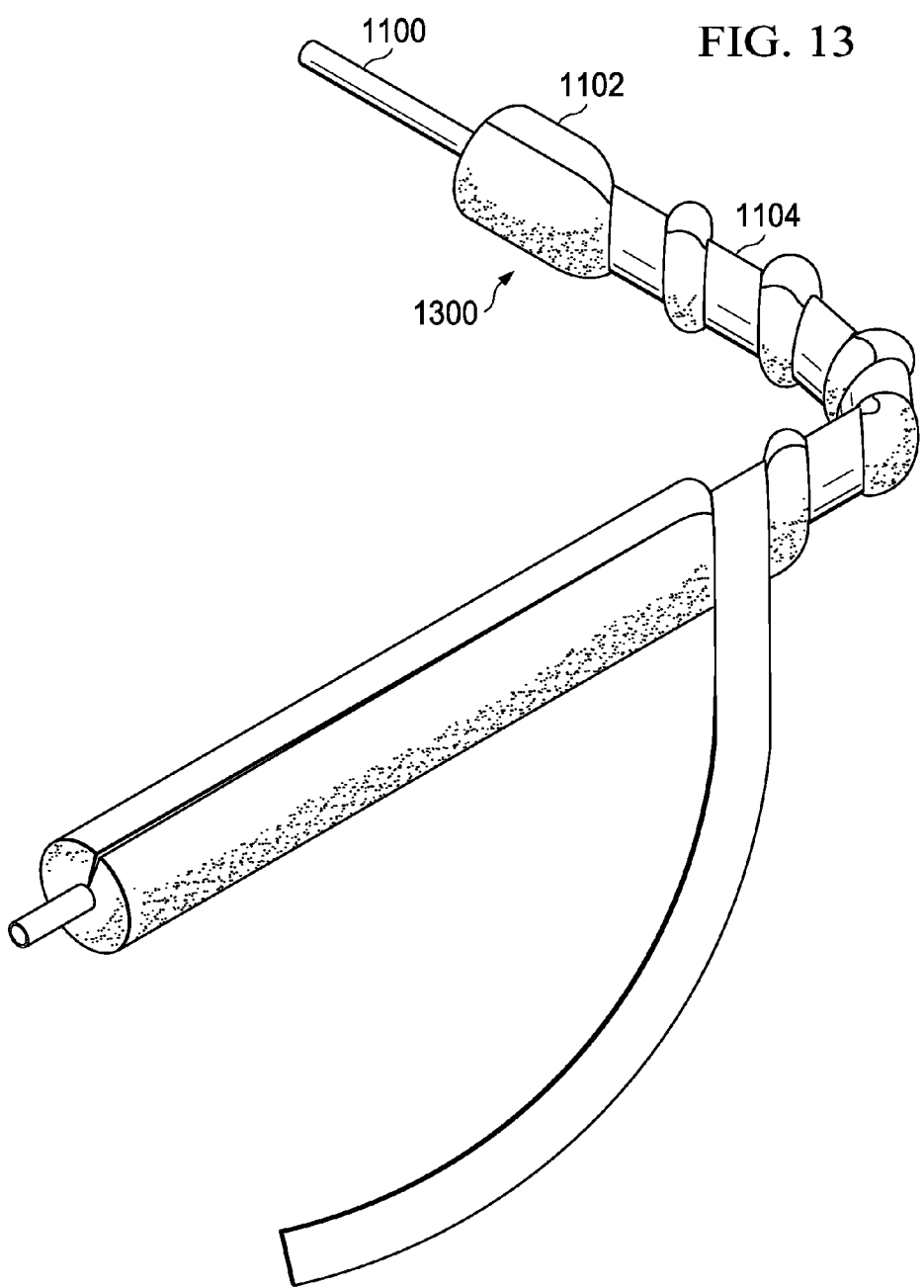
FIG. 13 is another illustration for a process for insulating a fluid line in accordance with an advantageous embodiment.

In FIG. 13, a portion of cover 1104 has been wrapped around foam 1102. As depicted, cover 1104 has helical shape 1300. Helical shape 1300 for cover 1104 allows cover 1104 to be wrapped around foam 1102. Cover 1104 is wrapped around foam 1102 to hold foam 1102 in place around fluid line 1100. Further, cover 1104 wraps around foam 1102 such that fluid line 1100 does not slip out of slit 1200.

Turning now to FIG. 14, cover 1104 has been completely wrapped around foam 1102. Further, clamp 1106 and clamp 1108 have been placed around fluid line 1100 at end 1400 and end 1402, respectively, of foam 1102. Clamp 1106 and clamp 1108 hold, foam 1102 in place around fluid line 1100 such that foam 1102 does not move in a direction along the length of fluid line 1100.

With reference now to FIG. 15, an illustration of a flowchart of a process for insulating a fluid line is depicted in accordance with an advantageous embodiment. The process illustrated in FIG. 15 may be implemented using insulation system 200 in FIG. 2. For example, insulation system 200 may be used to insulate fluid line 224 in FIG. 2.

The process begins by collecting a fluid within a volume of a structure surrounding a fluid line (operation 1500). The fluid in the structure may be collected from fluid in a container in which the fluid line is located. This fluid may be, for example, fuel. The structure may collect she fluid by allowing the fluid to flow into the volume of the structure.

Thereafter, the process reduces a flow of the fluid within the volume of the structure such that the fluid within the volume of the structure insulates the fluid line (operation 1502), with the process terminating thereafter. In operation 1502, the flow of the fluid within the volume of the structure is reduced such that a desired level of insulation is provided for the fluid line. For example, in some cases, the flow of the fluid in the volume of the structure is reduced such that the fluid is substantially stagnant within the volume of the structure.

The flowcharts and block diagrams in the different depicted embodiments illustrate the architecture, functionality, and operation of some possible implementations of apparatus and methods in an advantageous embodiment. In this regard, each block in the flowcharts or block diagrams may represent a module, a segment, a function, and/or a portion of an operation or step. For example, one or more of the blocks may be implemented as program code, in hardware, or a combination of the program code and hardware. When implemented in hardware, the hardware may, for example, take the form of integrated circuits that are manufactured or configured, to perform one or more operations in the flowcharts or block diagrams.

In some alternative implementations of an advantageous embodiment, the function or functions noted in the block may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

With reference to the different advantageous embodiments, an example of the reduction in the transfer of heat between a first fluid in a fluid line and a second fluid outside of the fluid line when using a structure, such as structure 220 from FIG. 2 is described below. In this illustrative example, hydraulic fluid 211 is flowing through fluid line 224 from FIG. 2. Fluid line 224 is located in fuel tank 216 and is fully immersed in fuel 218 from FIG. 2.

In this illustrative example, the following assumptions are made;

L=0.375 in=0.375 inches
$T_f$=−40° F.=−40 degrees Fahrenheit
$T_{ls}$=0° F.=0 degrees Fahrenheit where, L is the outside diameter of fluid line 224, $T_f$ is the temperature of fuel 218, and $Tl_s$ is the temperature of the outer surface of fluid line 224.

Further, the following assumptions are made about the characteristics of fuel 218.

Fuel Characteristics:

$C_p$ = .4 BTU/lbm−° F.

= .4 British Thermal Units per pound-mass-degrees Fahrenheit $k$ = .078 BTU/hr−ft−° F.

= .078 British Thermal Units per hour-foot-degrees Fahrenheit $v$ = .221 ft²/hr = .221 feet-sqaured per hour $\beta$ = .000516/° F. = .000516 per degrees Fahrenheit $\rho$ = 53.2 lbm/ft³ = 53.2 pounds-mass per foot cubed where $C_p$ is specific heat, k is thermal conductivity, v is kinematic viscosity, β is the volumetric coefficient of expansion, and ρ is the mass density for fuel 218.

Heat loss from the outer surface of fluid line 224 to fuel 218 in fuel tank 216 occurs in response to connective currents at the outer surface of fluid line 224. The amount of heat loss per foot length of fluid line 224 is given by the following equation:

$$Q=h(T_s-T_f)\pi d, \text{ where} \quad (1)$$

$$h=Nu(k/d), \quad (2)$$

$$N=0.53(GrPr)^{0.25}, \quad (3)$$

$$Pr=C_p v\rho/k, \quad (4)$$

$$Gr_d=[L^3 g\beta\rho^2(T_s-T_f)]/\mu^2, \text{ and} \quad (5)$$

where Q is heat loss, h is the Film coefficient, Nu is the Nusselt Equation, π is the number pi, d is the diameter at which convective currents in fuel 218 in fuel tank 216 are encountered, Gr is the Grashof number, Pr is the Prandtl number, g is gravity, $T_s$ is the temperature of the surface at which convective currents in fuel 218 in fuel tank 216 are encountered, and μ is the viscosity of fuel 218. In this case, d is the outer diameter of fluid line 224, L, while $T_s$ is the temperature of the outer surface of fluid line 224, $T_{ls}$.

Given the assumptions listed above, the heat loss from the outer surface of fluid line 224 to fuel 218 per foot length of fluid line 224 is about 126 British Thermal Units per hour-feet (BTU/hr-ft). In other words, about 126 British Thermal Units of heat are transferred from the outer surface of fluid line 224 to fuel 218 in fuel tank 216 every hour for each foot in length of fluid line 224.

However, when structure 220 from FIG. 2 is placed around fluid line 224, this heat loss is reduced. In particular, structure 220 reduces the connective currents in fuel 218 at the outer surface of fluid line 224 such that the heat transferred to fuel 218 in fuel tank 216 is reduced.

For example, with structure 220, fuel 218 is retained within volume 226 in structure 220. Fuel 218 in volume 226 forms a pool of fuel 218 around fluid line 224 in which a flow of fuel 218 in this pool is reduced. In other words, structure 220 is configured such that fuel 218 within volume 226 is substantially stagnant in this illustrative example. When fuel 218 within volume 226 in structure 220 around fluid line 224 is reduced, the connective currents in fuel 218 around fluid line 224 are also reduced. As a result, the amount of heat transferred from the outer surface of fluid line 224 to fuel 218 within volume 226 of structure 220 is reduced. In this manner, the heat transferred from the outer surface of fluid line 224 to fuel 218 within fuel tank 216 outside of structure 220 is also reduced.

In particular, the amount of heat loss from the outer surface of fluid line 224 through structure 220 is given by the following equation:

$$Q=2\pi L(\Delta T)k/\ln(OD/ID), \quad (6)$$

where Q is heat loss, ΔT is the difference between the temperature at the outer surface of fluid line 224 and the outer surface of structure 220, OD is the outer diameter of structure 220, and ID is the inner diameter of structure 220. In this illustrative example, the inner diameter of structure 220 is substantially the same as the outer diameter of fluid line 224, L.

When solving for Q in equation (6), the temperature at the outer surface of fluid line 224 is estimated. Given the above assumptions, the temperature at the outer surface of fluid line 224 should be between about 0 degrees Fahrenheit, which is the temperature of the outer surface of fluid line 224, and about negative 40 degrees Fahrenheit, which is the temperature of fuel 218 in fuel tank 216.

This estimated temperature is used to solve for Q in equation (6) as well as Q in equation (1), where d is the outer diameter of structure 220, OD, and $T_s$ is the temperature at the outer surface of structure 220 in equation (1). Further, the estimated temperature is adjusted until the calculated value for Q in equation (6) is substantially the same, within selected tolerances, as the calculated value for Q in equation (1), when d is the outer diameter of structure 220, OD, and $T_s$ is the temperature at the outer surface of structure 220.

Given the different assumptions made in this example, the heat loss from the surface of fluid line 224 to fuel 218 in fuel tank 216 when structure 220 is used is about 23.7 British Thermal Units per hour-feet (BTU/hr-ft). In this manner, using structure 220 to provide insulation for fluid line 224 reduces the transfer of heat from the outer surface of fluid line 224 into fuel 218 in fuel tank 216 by about 81 percent.

Advantageous embodiments of the disclosure may be described in the context of aircraft manufacturing and service method 1600 as shown in FIG. 16 and aircraft 1700 as shown in FIG. 17. Turning first to FIG. 16, an illustration of an aircraft manufacturing and service method is depicted in accordance with an advantageous embodiment. During pre-production, aircraft manufacturing and service method 1600 may include specification and design 1602 of aircraft 1700 in FIG. 17 and material procurement 1604. Aircraft 1700 may be an example of one implementation of aircraft 208 in FIG. 2.

During production, component and subassembly manufacturing 1606 and system integration 1608 of aircraft 1700 in FIG. 17 takes place. Thereafter, aircraft 1700 in FIG. 17 may go through certification and delivery 1610 in order to be placed in service 1612.

While in service 1612 by a customer, aircraft 1700 in FIG. 17 is scheduled for routine maintenance and service 1614, which may include modification, reconfiguration, refurbishment, and other maintenance or service. In these illustrative examples, insulation system 200 from FIG. 2 may be used to insulate a fluid line for a hydraulics system in aircraft 1700 during at least one of component and subassembly manufacturing 1606, system integration 1608, and maintenance and service 1614.

Each of the processes of aircraft manufacturing and service method 1600 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 17, an illustration of an aircraft is depicted in which an advantageous embodiment may be implemented. In this example, aircraft 1700 is produced by aircraft manufacturing and service method 1600 in FIG. 16 and may include airframe 1702 with plurality of systems 1704 and interior 1706. Examples of systems 1704 include one or more of propulsion system 1708, electrical system 1710, hydraulic system 1712, and environmental system 1714. Any number of other systems may be included. Although an aerospace example is shown, different advantageous embodiments may be applied to other industries, such as the automotive industry.

Apparatuses and methods embodied herein may be employed during at least one of the stages of aircraft manufacturing and service method 1600 in FIG. 16.

In one illustrative example, components or subassemblies produced in component and subassembly manufacturing 1606 in FIG. 16 may be fabricated or manufactured in a manner similar to components or subassemblies produced while aircraft 1700 is in service 1612 in FIG. 16.

As yet another example, one or more apparatus embodiments, method embodiments, or a combination thereof may be utilized during production stages, such as component and subassembly manufacturing 1606 and system integration 1608 in FIG. 16. One or more apparatus embodiments, method embodiments, or a combination thereof may be utilized while aircraft 1700 is in service 1612 and/or during maintenance and service 1614 in FIG. 16. The use of a number of the different advantageous embodiments may substantially expedite the assembly of and/or reduce the cost of aircraft 1700.

Thus, the different advantageous embodiments provide a method and apparatus for insulating fluid lines. In one advantageous embodiment, an apparatus comprises a structure configured to be placed around a fluid line. The structure is configured to reduce the flow of fluid in a volume within the structure. This reduction of flow of fluid provides a substantially stagnant pool of fluid adjacent to the fluid line. This substantially stagnant pool of fluid insulates the fluid line.

In this manner, the different advantageous embodiments provide a system for insulating fluid lines in a hydraulics system for an aircraft without adding undesired weight to the aircraft. Further, using fuel that is already present in a fuel tank of the aircraft to insulate these fluid lines provides the desired level of thermal insulation for the fluid lines without significantly increasing the weight and/or cost for providing this thermal insulation.

The description of the different advantageous embodiments has been presented for purposes of illustration and description, and is not intended to be exhaustive or limited to the embodiments in the form disclosed. Many modifications and variations will be apparent to those of ordinary skill in the art. Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An thermal insulation system comprising:
   a container containing a first fluid;
   a fluid line in the container containing a second fluid; and
   a tube placed around a first portion of the fluid line in the container to form a channel around the first portion of the fluid line, wherein a diametrical cross-section of the tube comprises a C-shape, wherein the tube contains the first fluid from the container in the channel and prevents a first flow of the first fluid between the container and the channel except through a number of ends of the tube, and wherein the tube reduces a second flow of the first fluid within the channel such that the first fluid in the channel insulates the second fluid contained within the fluid line.

2. The thermal insulation system of claim 1 further comprising:
   a retaining system holding the tube around the fluid line.

3. The thermal insulation system of claim 2, wherein the retaining system comprises:
   a number of clamps configured to reduce movement of the tube along the fluid line.

4. The thermal insulation system of claim 1, wherein:
   the channel configured to contain the first fluid from the container is a first channel;
   an inner surface of the tube defines the first channel;
   a second portion of an outer surface of the tube defines a second channel located in the first channel such that the first channel surrounds the second channel; and
   the fluid line is positioned in the second channel.

5. The thermal insulation system of claim 4, wherein the tube has a flexibility that allows the second channel to receive the fluid line through an opening extending along a length of the second channel.

6. The thermal insulation system of claim 4, wherein:
   the portion of the outer surface of the tube defining the second channel is in substantially continuous contact with the fluid line.

7. The thermal insulation system of claim 1, wherein:
the second fluid contained within the fluid line is hydraulic fluid;
the container is a fuel tank containing the first fluid; and
the first fluid in the container is a fuel, wherein the fuel is selected such that a thermal conductivity of the fuel provides a desired level of insulation for the second fluid contained within the fluid line.

8. The thermal insulation system of claim 7, wherein the tube retains the fuel within the channel when the tube is at least partially immersed in the fuel in the container and wherein the fuel retained within the channel flows out of the channel as a level of the fuel in the container lowers in a manner that results in less of a volume of the channel being filled with the fuel.

9. The thermal insulation system of claim 7, wherein the apparatus maintains a desired temperature for the second fluid contained within the fluid line when the fuel in the container has a temperature of about minus 40 degrees Fahrenheit.

10. The thermal insulation system of claim 1, wherein:
the tube comprises two ends and at least one of the two ends is blocked such that the first flow of the first fluid and the second flow of the first fluid are reduced to provide a desired level of insulation for the second fluid contained within the fluid line.

11. The thermal insulation system of claim 10, wherein:
the two ends are blocked such that the first flow of the first fluid and the second flow of the first fluid are reduced to provide the desired level of insulation for the second fluid contained within the fluid line.

12. The thermal insulation system of claim 1, wherein the flow of the first fluid that is reduced is caused by a convective current through the first fluid in the container.

13. The thermal insulation system of claim 1, further comprising:
a platform in which the fluid line and the container are located, wherein the platform is selected from the group consisting of an aquatic-based structure, a space-based structure, an unmanned aerial vehicle, a helicopter, a submarine, a bus, a tank, a train, an automobile, a spacecraft, a space station, a satellite, a surface ship, a power plant, a dam, a manufacturing facility, and a building.

14. The thermal insulation system of claim 1, wherein:
the tube comprises a series of folds configured to provide the tube with a flexibility to allow the tube to be slid down a length of the fluid line comprising bends;
the channel is between an inner surface of the tube and the fluid line;
the tube comprises two ends; and
at least one of the two ends is blocked such that the first flow of the first fluid and the second flow of the first fluid are reduced to provide a desired level of insulation for the second fluid contained within the fluid line.

15. A method for thermally insulating a fluid line in a container configured to contain a first fluid, the method comprising:
placing a tube around the fluid line in the container to form a channel around a first portion of the fluid line, wherein a diametrical cross-section of the tube comprises a C-shape;
insulating a second fluid contained within the fluid line, wherein the insulating comprises:
containing the first fluid from the container in the channel of the tube; and
preventing a first flow of the first fluid between the container and the channel except through a number of ends of the tube; and
reducing a second flow of the first fluid within the channel.

16. The method of claim 15, wherein the tube and the fluid line are located in a fuel tank, wherein the first fluid is a fuel selected such that a thermal conductivity of the fuel provides a desired level of insulation for the second fluid contained within the fluid line.

17. The method of claim 16, wherein the fuel tank is in an aircraft, wherein insulating the second fluid contained within the fluid line further comprises:
insulating a second fluid contained within the fluid line, wherein the fluid line is located in the fuel tank of the aircraft.

18. The method of claim 15, wherein:
the channel configured to contain the first fluid from the container is a first channel;
an inner surface of the tube defines the first channel;
a second portion of an outer surface of the tube defines a second channel located in the first channel such that the first channel surrounds the second channel; and
the fluid line is positioned in the second channel.

* * * * *